United States Patent [19]

Strosser

[11] Patent Number: 4,756,244
[45] Date of Patent: Jul. 12, 1988

[54] RECTANGULAR BALER WITH DYNAMIC TESTING OF LOAD CELLS

[75] Inventor: Richard P. Strosser, Akron, Pa.

[73] Assignee: Ford New Holland, Inc., New Holland, Pa.

[21] Appl. No.: 55,976

[22] Filed: Jun. 1, 1987

[51] Int. Cl.$^4$ .............................................. B30B 15/26
[52] U.S. Cl. ......................................... 100/41; 100/4; 100/43; 100/191
[58] Field of Search ..................... 100/45, 41, 43, 3, 4, 100/189, 50, 191; 56/341; 360/424

[56] References Cited

U.S. PATENT DOCUMENTS 4,202,262  5/1980  Claas et al. .................. 100/45 X
4,611,535  9/1986  Anstey et al. ..................... 100/43
4,624,180  11/1986  Strosser ............................. 100/41
4,627,341  12/1986  Sudbrack et al. .................. 100/41

Primary Examiner—Andrew M. Falik
Attorney, Agent, or Firm—Griffin, Branigan & Butler

[57] ABSTRACT

In a rectangular baler wherein right and left conrod load cells measure the force applied to plungers for compacting crop material, a microprocessor based control circuit monitors the loads registered by the load cells. The microprocessor produces output signals to control the baler in accordance with the loads sensed by the cells. On a stroke of the plunger, a one-quarter second interval is tolled after one cell registers a load. If the second cell does not register a load within the interval it is assumed that it is faulty. In order to permit continued operation of the baler, the output of the good cell is assumed to be, and is used by the microprocessor as if it were the output of the faulty cell.

2 Claims, 1 Drawing Sheet

RECTANGULAR BALER WITH DYNAMIC TESTING OF LOAD CELLS

This application relates to Strosser U.S. Pat. No. 4,624,180 and Sudbrack et al. U.S. Pat. No. 4,627,341, the disclosures of which are incorporated herein by reference.

BACKGROUND OF THE INVENTION

Strosser U.S. Pat. No. 4,624,180 discloses a microprocessor-based control circuit for controlling a large rectangular baler by sensing the load placed on load cells as a plunger compresses crop material into bales in the bale case of the baler. The load cells are strain gages such as piezoelectric or resistive devices which sense shear stresses as the plunger compacts crop material and forces it through the bale case. The output signals from the load cells may be analyzed by a microprocessor-based control circuit to develop control signals for adjusting tension rails comprising part of the bale case. By adjusting the tension rail pressure, the density of crop material in formed bales may be controlled. The load cells, particularly if they are piezoelectric devices, are subject to both mechanical failure (separation of strain gage from structural member whose stress it is measuring) and electrical failure (broken leads or loose connections). When a load cell fails on such a baler the unit must be operated manually. This is inconvenient, causes down-time, and results in lower density bales. On the other hand, the operator may wish to continue the baling operation because of impending adverse weather conditions or for other reasons. The present invention provides a temporary solution to this problem, permitting the baler to remain in operation until it is more convenient to return it to a shop for repairs.

SUMMARY OF THE INVENTION

An object of the present invention is to provide a method and means for detecting failure of a load cell and upon detection of a failure using the value of the load sensed at one load cell as an assumed value of the load at the other load cell, whereby the microprocessor may continue to control the baler.

In accordance with the principles of the present invention the microprocessor is programmed to test for a load on a second load cell within a ¼ second interval after a load is sensed on a first load cell. If the second load cell does not show a load within ¼ second of the first, a dynamic fault is indicated on a display. In addition, the value of the load sensed at the good cell is assumed to be the load on the faulty cell and this value is used by the microprocessor as the load on each of the two cells, so that control of the baler may continue.

Other objects of the invention and its mode of operation will become apparent upon consideration of the following description and the accompanying drawings.

DESCRIPTION OF A PREFERRED EMBODIMENT

Figure 2:
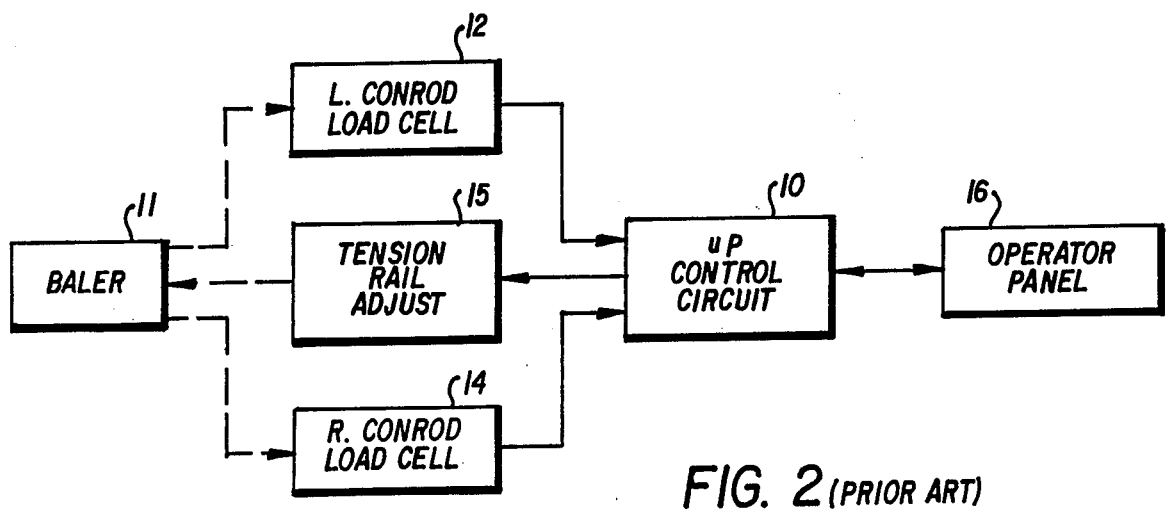

FIG. 2 schematically illustrates a square baler and control system of the type disclosed in Strosser U.S. Pat. No. 4,624,180. As disclosed in the patent, the baler 11 has a plunger for forcing crop material into and through a bale case. The bale case is provided with adjustable tension rails which may be moved to change the cross-sectional area of the bale case. Adjustment of the tension rail pressure changes the force which the plunger must exert on the crop material in order to force it through the bale case. The density of crop material in a formed bale is determined by the force the plunger must exert to force the bale through the bale case. Thus, by adjusting the tension rails one may vary the density of the bales being formed.

The Strosser patent further discloses that left and right connecting rod (conrod) load cells 12 and 14 may be located at plunger connecting rod bearings to sense the force exerted by the plunger. The load cells produce output signals which are sampled by a microprocessor-based control circuit 10. An operator panel 16 is provided for entering a desired bale density. The control circuit 10 computes a density from the signals produced by the load cells, compares it to the desired density as set by the operator at panel 16, and produces output signals to control an apparatus 15 which adjusts the tension rail pressure so that bales of desired density are produced. The control circuit also causes status and various system parameters to be displayed at operator panel 16. In the Strosser patent, computation of the bale density by the control circuit 10 includes adding the values derived from the outputs of the left and right conrod load cells. If one load cell fails, the subsequent comparison of the sum of the load cell outputs with the desired density set by the operator at panel 16 will indicate (falsely) that the density of the bale being formed is considerably less than the desired density. Accordingly, the control circuit 10 generates control signals to increase the tension rail pressure inwardly to thereby cause an increase in the density of the bale. This will, at the least, result in the formation of bales which are too dense, and may result in overloading the compaction mechanism to the point of damage or failure. The instant invention overcomes this problem after it has been determined that one load cell has failed by producing a control signal which is twice the magnitude of the output signal from the good load cell.

Figure 1:
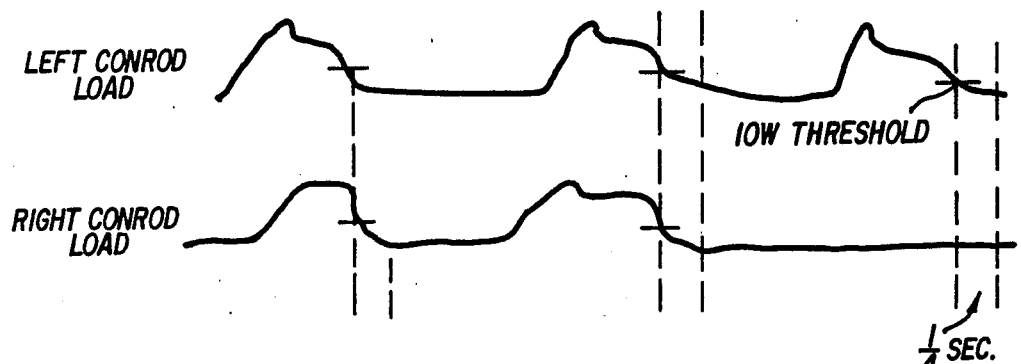
FIG. 1 illustrates conrod load waveforms for a left and a right connecting rod; and, FIG. 2 is a block diagram of a microprocessor-based control circuit for a rectangular baler.

FIG. 1 illustrates the output of a left conrod load cell and a right conrod load cell, the cells being located at plunger connecting rod bearings as shown in Strosser U.S. Pat. No. 4,624,180 and Sudrack et al. U.S. Pat. No. 4,627,341. In FIG. 1 both load cells complete each of two cycles within ¼ second of each other. However, on the third cycle the right conrod load cell fails to cycle so that it does not cycle within ¼ second of the time the left conrod load reaches a low threshold.

The microprocessor control circuit 10 executes an interrupt sequence IRQT about every 500 microseconds and if a peak of conrod loading is detected the program branches to a LOOP routine. During execution of the LOOP routine a LOGIC routine is called wherein macroinstructions set various flags in accordance with inputs read during a previous scan of the various inputs to the microprocessor. The portions of these routines relating to the present invention are attached to this specification as an appendix.

In the appendix, the flag 1701B is set if initialization is complete and the logic detects a left conrod dynamic fault. Flag 1701C is set for ¼ second if the logic detects a right conrod fault.

The flags are tested during the next IRQT execution. Considering the left conrod, the right fault flag 1701C is tested at IRQT 25 and if it is set the program branches to MF1 where the left threshold flag IRQT 35A is set to 1 and the high threshold preset count in SYVR 30A is loaded into the right load cell high threshold count location IRQT 12A. Next, the maximum left load cell reading in IRQT 4A is transferred to IRQT 16A and IRQT 4A is cleared. A jump is then made to the LOOP routine.

Steps IRQT 36, MF2 and IRQT 40 perform similar operations to the ones described above to check the right threshold. However, at the completion of these steps the routine jumps to LOOP 2.

In LOOP, the right conrod fault flag 1701C is tested and if it is not set the program branches to LOOP 1. However, if 1701C is set IRQT 41A, the left slip count buffer, is cleared, and LOOP 18a, the dynamic failure flag, is set to all ones. This flag will cause the message "dF" to be displayed at the operator's panel the next time the Main routine is executed. Next, the right conrod peak reading IRQT 17A is set to all ones before a branch is made to LOOP 2.

In LOOP 2, the value in the accumulator is stored in LOOP 4A, the location for the left conrod peak reading. This value will be all ones if LOOP 2 is entered from Loop or the maximum IRQT 14A for the right load cell if LOOP 2 is entered from IRQT 40.

Subroutines LOOP 6 through LOOP 8 perform functions similar to LOOP through LOOP 2, the only difference being that they check for a right conrod peak.

LOOP 1 is entered if the test in Loop shows that flag 1701C is not set. The value 080H is loaded into 1BP, the flags for left dynamic conrod failure and left conrod overload are cleared, and the left conrod peak value in IRQT 16A is loaded into the accumulator so that it is stored in LOOP 4A when LOOP 2 is entered.

Thus, if a conrod cell failure is detected the load placed on the other conrod is assumed to be the load on the conrod with the failed cell. The microprocessor then uses this assumed value and continues its operation as described in the Strosser patent.

While a preferred embodiment of the invention has been described in specific detail it will be obvious that various substitutions and modifications can be made in the described embodiment without departing from the spirit and scope of the invention as defined by the appended claims.

APPENDIX
DYNAMIC TEST OF CONROD LOAD CELLS: May 7,1987
CODE FROM MODULE LGIC;
```
*
*       CON ROD FAULT
*       TDON    (250)/50,1BB,1BP,1701B
        TDON    (250)/50,1BB,1BZ,1701C
        CNT     (10),1BB,1701B,1CB,1703E
        CNT     (10),1BB,1701C,1CB,1703F
        PROG    *
        CLR     L1CB *
        OR2     1703E,1703F,1702A
*
        NOT     1704A,1705A *
        AND2    1907C,1705A,1706D
*
        LSR0    1BB,1703F,1907C,1704A
*
        NOT     1704B,1705B *
        AND2    1706D,1705B,1706B
*
        LSR0    1BB,1703E,1706D,1704B
*
```

APPENDIX-continued
DYNAMIC TEST OF CONROD LOAD CELLS: May 7,1987
```
        SS1     1704A,1706A *
        SS1     1704B,1706C *
CODE FROM MODULE IRQT:
*
*       CHECK LEFT THRESHOLD ... HIGH
*
        EXTEND
IRQT25  LDA B   L1701C          CHECK FOR MISS FIRE
        DIRECT
        BMI     MF1             BRANCH IF MISS FIRE
        .
        .
MF1     LDA A   #1              SET THRESHOLD FLAG
        STA A   IRQT35A         *
        LDA A   #SYVR30A        GET HIGH COUNT PRE-
                                SET
        STA A   IRQT12A         *
*
*       LEFT CONROD STROKE COMPLETE; PROCESS
*       LOOP
        LDA A   IRQT4A          GET VMAX
IRQT29  STA A   IRQT16A         STORE VMAX AT
                                VPEAK
        CLR     IRQT4A          CLEAR VMAX
        JMP     LOOP            GO PROCESS LOOP
*
*       CHECK RIGHT THRESHOLD ... HIGH
*
        EXTEND
IRQT36  LDA B   L1701B          GET MISS FIRE
        DIRECT
        BMI     MF2             BRANCH IF MISS FIRE
        .
        .
MF2     LDA A   #1              SET THRESHOLD FLAG
        STA A   IRQT40A         *
*
*       RIGHT CONROD STROKE COMPLETE: PROCESS
*       LOOP
        LDA A   IRQT14A         GET VMAX
IRQT40  STA A   IRQT17A         STORE VMAX AT
                                VPEAK
        CLR     IRQT14A        . CLEAR VMAX
        JMP     LOOP2           GO PROCESS LOOP
CODE FROM MODULE LOOP:
*
*       CHECK FOR LEFT CONROD PEAK
*
LOOP    LDA A   L1701C          *
        DIRECT                  *
        BPL     LOOP1           *
        CLR A                   *
        STA A   IRQT41A         CLEAR: "BUFFER: LEFT
                                SLIP"
        COM A                   *
        STA A   LOOP18A         SET: "FLAG: DISPLAY
                                DYN FAIL"
        LDA A   IRQT17A         GET: "BUFFER: RIGHT
                                CONROD PEAK
        BRA     LOOP2           *
LOOP1   LDA B   #080H           *
        EXTEND                  *
        STA B   L1BP            *
        DIRECT                  *
        CLR A                   *
        STA A   LOOP18A         CLEAR: "FLAG: LEFT
                                CR DYN FAIL"
        STA A   LOOP39A         CLEAR: "FLAG: LEFT
                                CR OVERLOAD"
        LDA A   IRQT16A         GET LEFT CONROD
                                VPEAK
LOOP2   STA A   LOOP4A          STORE AT TEMP.
*
*       CHECK FOR RIGHT CONROD PEAK
*
        EXTEND                  *
LOOP6   LDA B   L1701B          *
        DIRECT                  *
        BPL     LOOP7           *
```

APPENDIX-continued

DYNAMIC TEST OF CONROD LOAD CELLS: May 7, 1987

|       | CLR A          |         | *                              |
|-------|----------------|---------|--------------------------------|
|       | STA A          | IRQT45A | CLEAR: "BUFFER: RIGHT SLIP"    |
|       | COM A          |         | *                              |
|       | STA A          | LOOP22A | SET: "FLAG: RIGHT DYN FAIL"    |
|       | LDA B          | IRQT16A | GET: "BUFFER: LEFT CONROD PEAK"|
|       | BRA            | LOOP8   | *                              |
| LOOP7 | LDA B          | #080H   | *                              |
|       | EXTEND         |         | *                              |
|       | STA B          | L1BZ    | *                              |
|       | DIRECT         |         | *                              |
|       | CLR A          |         | *                              |
|       | STA A          | LOOP22A | CLEAR: "FLAG: RIGHT CR DYN FAIL"|
|       | STA A          | LOOP40A | CLEAR: "FLAG: RIGHT CR OVERLOAD"|
|       | LDA B          | IRQT17A | GET RIGHT CONROD VPEAK         |
| LOOP8 | STA B          | LOOP5A  | SAVE IT                        |

The embodiments of the invention in which an exclusive property or privilege is claimed are defined as follows:

1. In a rectangular baler wherein right and left plunger conrod load cells produce output signals in accordance with the loads sensed by said cells and a control circuit is responsive to said output signals for producing control signals dependent upon the sum of the loads sensed by said cells, said baler being responsive to said control signals for forming bales of a desired density, the method comprising:
   sensing the output signals of said load cells for load peaks;
   determining if a second of said load cells senses a load peak within a predetermined interval after a first of said load cells senses a load peak; and,
   using the output of the first load cell in place of the output from said second cell to produce said control signal if said second load cell does not sense a load peak within a predetermined interval after said first load cell senses a load peak;
   whereby said control signal is determined by twice the magnitude of the output signal of the load cell which does sense a peak load.

2. In a rectangular baler wherein right and left plunger conrod load cells produce output signals in accordance with the loads sensed by said cells and a control circuit is normally responsive to said output signals for producing control signals dependent upon the sum of the loads sensed by said cells, said baler being responsive to said control signals for forming bales of a desired density, the method comprising:
   determining when one of said load cells does not produce output signals in accordance with the load sensed by said one load cell; and,
   producing, as said control signals, signals having a magnitude which is proportional to twice the magnitude of the output signal of a second of said load cells when it is determined that said one load cell does not produce output signals in accordance with the load sensed thereby.

* * * * *